US009330689B1

(12) United States Patent  
Tretter

(10) Patent No.: US 9,330,689 B1  
(45) Date of Patent: May 3, 2016

(54) WRITE DRIVER DC RESISTANCE CALIBRATION

(71) Applicant: International Business Machines Corporation, Armonk, NY (US)

(72) Inventor: Larry L. Tretter, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/814,389

(22) Filed: Jul. 30, 2015

(51) Int. Cl.
*G11B 5/09* (2006.01)
*G11B 5/008* (2006.01)

(52) U.S. Cl.
CPC .............. *G11B 5/09* (2013.01); *G11B 5/00813* (2013.01)

(58) Field of Classification Search
CPC ............. G11B 20/10009; G11B 2220/20; G11B 2220/90; G11B 5/09; G11B 5/012; G11B 5/00; G11B 5/02; G11B 27/36
USPC ............ 360/67, 31, 39, 46, 55, 65, 25, 73.04
See application file for complete search history.

(56) References Cited

U.S. PATENT DOCUMENTS

| 6,256,158 B1 | 7/2001 | Brown et al. |
| 6,744,578 B1 | 6/2004 | Bishop |
| 9,099,128 B1 * | 8/2015 | Contreras .............. G11B 5/455 |

* cited by examiner

*Primary Examiner* — Nabil Hindi  
(74) *Attorney, Agent, or Firm* — Zilka-Kotab, PC

(57) ABSTRACT

An apparatus, according to one embodiment, includes: a controller having: a first circuit having a reference resistance, a second circuit having an adjustable resistance, and logic integrated with and/or executable by the controller, the logic being configured to cause the controller to perform the following process: apply a voltage to the first and second circuits, compare output voltages of the first and second circuits, alter the resistance of the second circuit until the output voltage of the first circuit is less than or equal to the output voltage of the second circuit, extract setting information in response to determining that the first voltage of the first circuit is less than or equal to the second voltage of the second circuit, and apply the extracted setting information to a component of a write driver circuit for setting a resistance value of the component.

20 Claims, 11 Drawing Sheets

US 9,330,689 B1

WRITE DRIVER DC RESISTANCE CALIBRATION

BACKGROUND

The present invention relates to data storage systems, and more particularly, this invention relates to calibration of write driver resistance in tape drives.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. Similarly, improved data rates have been achieved by increasing the number of transducers positioned on a given head. However, developing smaller footprints, while also increasing the achievable data rate for higher performance tape drive systems, has created various problems in the design of a tape head assembly for use in such systems.

BRIEF SUMMARY

An apparatus, according to one embodiment, includes: a controller having: a first circuit having a reference resistance, a second circuit having an adjustable resistance, and logic integrated with and/or executable by the controller, the logic being configured to cause the controller to perform the following process: apply a voltage to the first and second circuits, compare output voltages of the first and second circuits, alter the resistance of the second circuit until the output voltage of the first circuit is less than or equal to the output voltage of the second circuit, extract setting information in response to determining that the first voltage of the first circuit is less than or equal to the second voltage of the second circuit, and apply the extracted setting information to a component of a write driver circuit for setting a resistance value of the component.

A computer program product, according to another embodiment, includes a computer readable storage medium having program instructions embodied therewith, the program instructions readable and/or executable by a controller to cause the controller to: apply, by the controller, a voltage to a first circuit having a reference resistance and a second circuit having an adjustable resistance, compare, by the controller, output voltages of the first and second circuits, alter, by the controller, the resistance of the second circuit until the output voltage of the first circuit is less than or equal to the output voltage of the second circuit, extract, by the controller, setting information in response to determining that the first voltage of the first circuit is less than or equal to the second voltage of the second circuit, and apply, by the controller, the extracted setting information to a component of a write driver circuit for setting a resistance value of the component.

A method, according to yet another embodiment, includes: passing a current through first and second circuits, the first circuit having a reference resistance, the second circuit having an adjustable resistance, comparing output voltages of the first and second circuits, altering the resistance of the second circuit at least once in response to determining that the first voltage of the first circuit is greater than the second voltage of the second circuit, extracting setting information in response to determining that the first voltage of the first circuit is less than or equal to the second voltage of the second circuit, and applying the extracted setting information to a component of a write driver circuit for setting a resistance value of the component.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
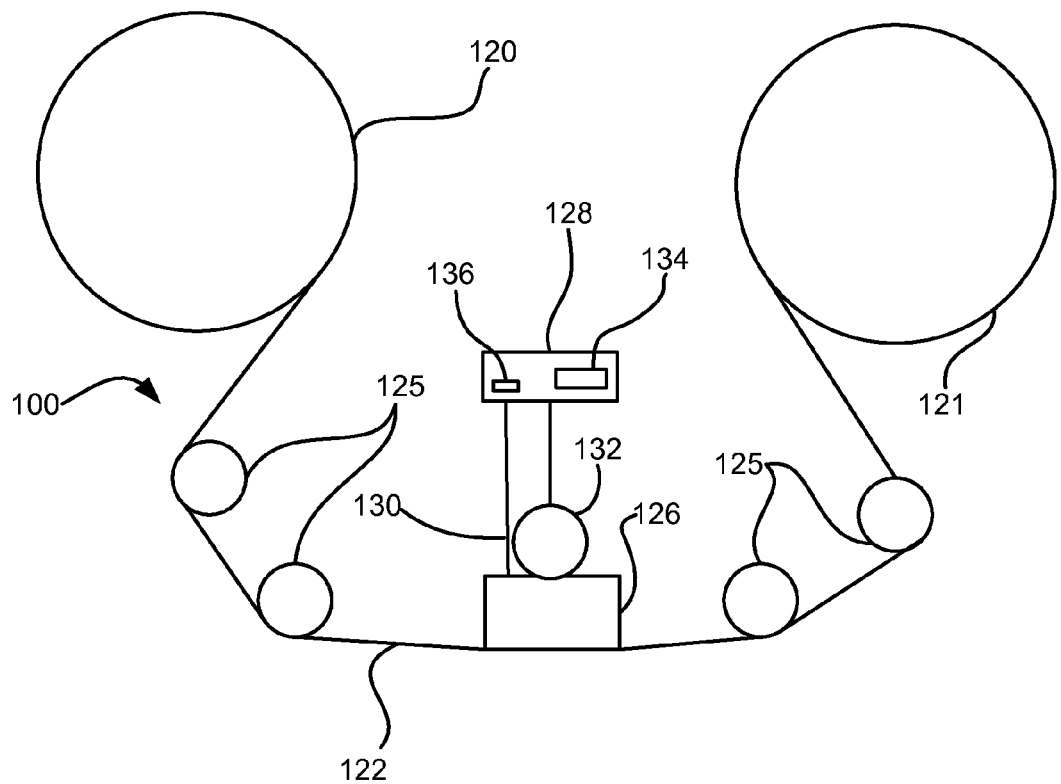
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes: a controller having: a first circuit having a reference resistance, a second circuit having an adjustable resistance, and logic integrated with and/or executable by the controller, the logic being configured to cause the controller to perform the following process: apply a voltage to the first and second circuits, compare output voltages of the first and second circuits, alter the resistance of the second circuit until the output voltage of the first circuit is less than or equal to the output voltage of the second circuit, extract setting information in response to determining that the first voltage of the first circuit is less than or equal to the second voltage of the second circuit, and apply the extracted setting information to a component of a write driver circuit for setting a resistance value of the component.

In another general embodiment, a computer program product includes a computer readable storage medium having program instructions embodied therewith, the program instructions readable and/or executable by a controller to cause the controller to: apply, by the controller, a voltage to a first circuit having a reference resistance and a second circuit having an adjustable resistance, compare, by the controller, output voltages of the first and second circuits, alter, by the controller, the resistance of the second circuit until the output voltage of the first circuit is less than or equal to the output voltage of the second circuit, extract, by the controller, setting information in response to determining that the first voltage of the first circuit is less than or equal to the second voltage of the second circuit, and apply, by the controller, the extracted setting information to a component of a write driver circuit for setting a resistance value of the component.

In yet another general embodiment, a method includes: passing a current through first and second circuits, the first circuit having a reference resistance, the second circuit having an adjustable resistance, comparing output voltages of the first and second circuits, altering the resistance of the second circuit at least once in response to determining that the first voltage of the first circuit is greater than the second voltage of the second circuit, extracting setting information in response to determining that the first voltage of the first circuit is less than or equal to the second voltage of the second circuit, and applying the extracted setting information to a component of a write driver circuit for setting a resistance value of the component.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
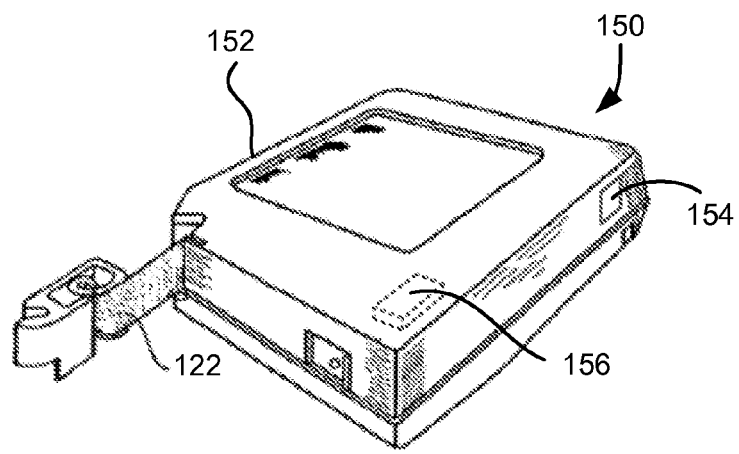
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
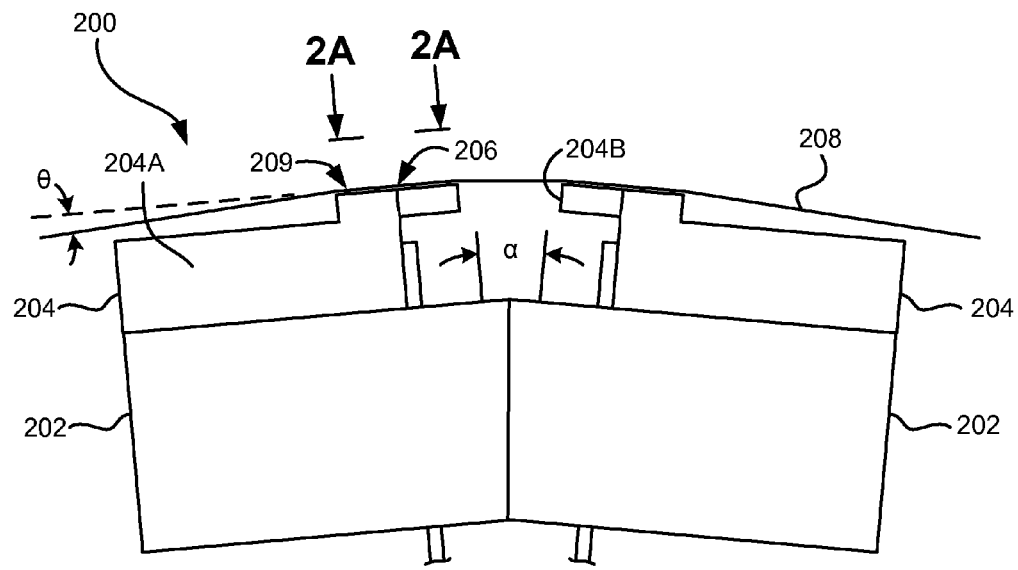
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
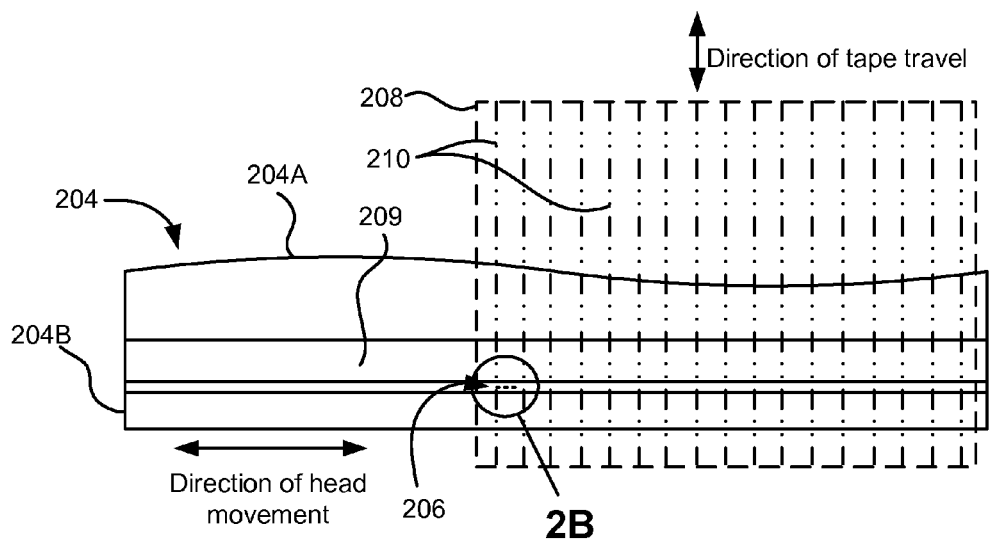
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
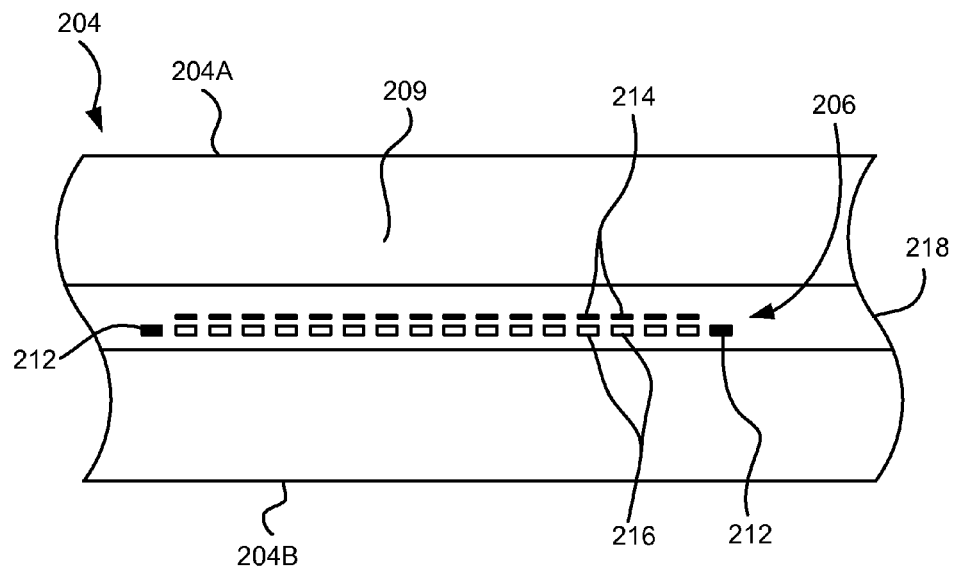
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
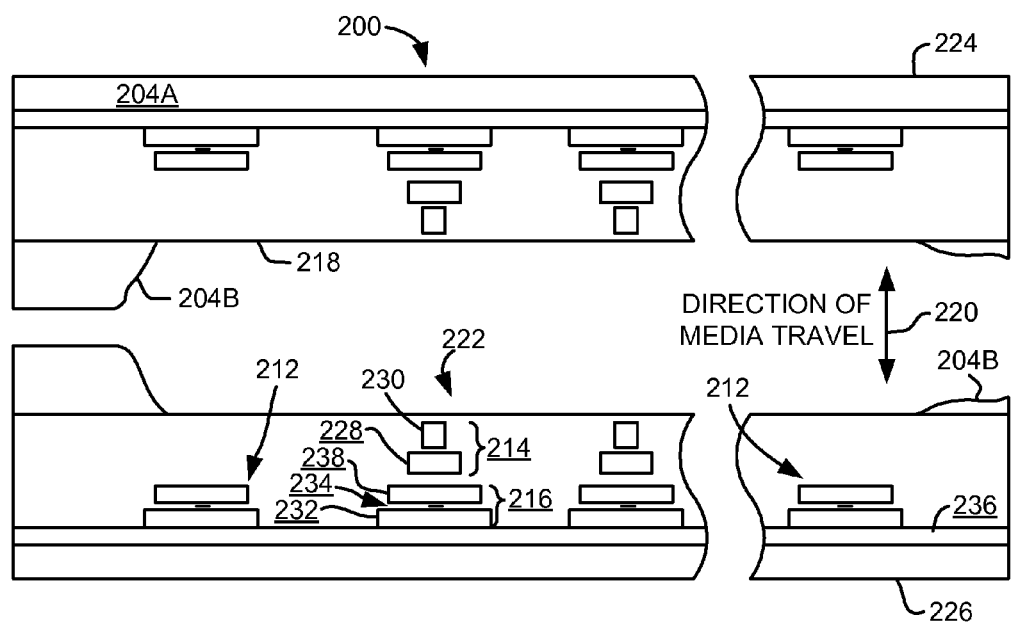
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (−), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
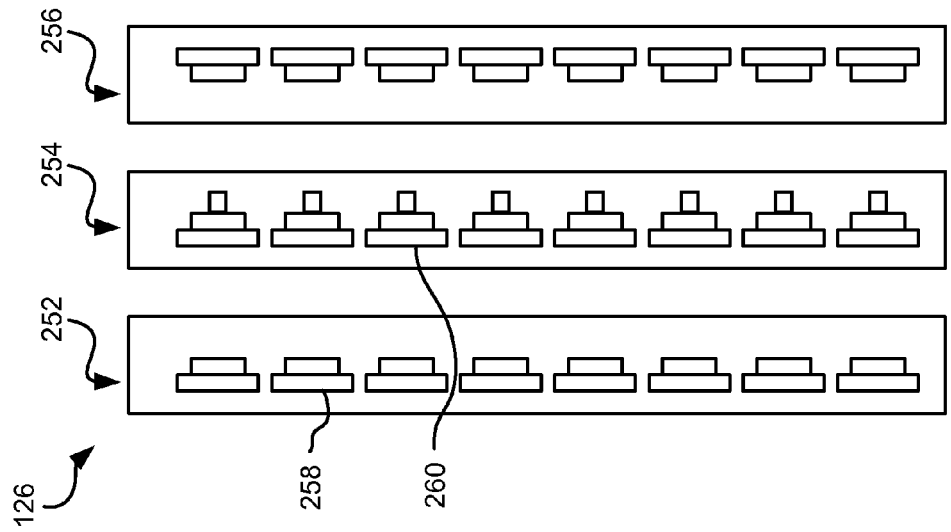
FIG. 4 is a partial tape bearing surface view of a magnetic head having a read-write-read configuration.
Figure 3:
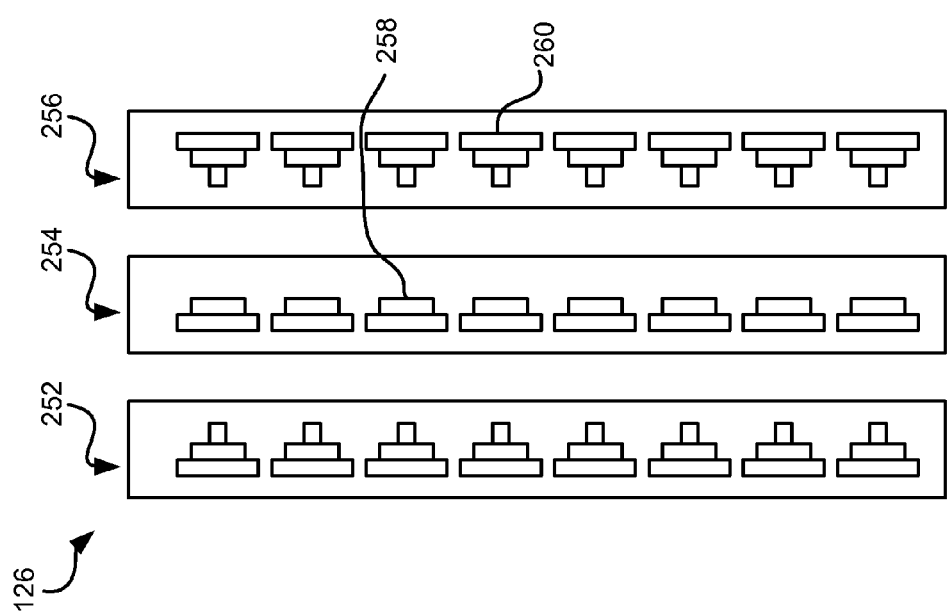
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
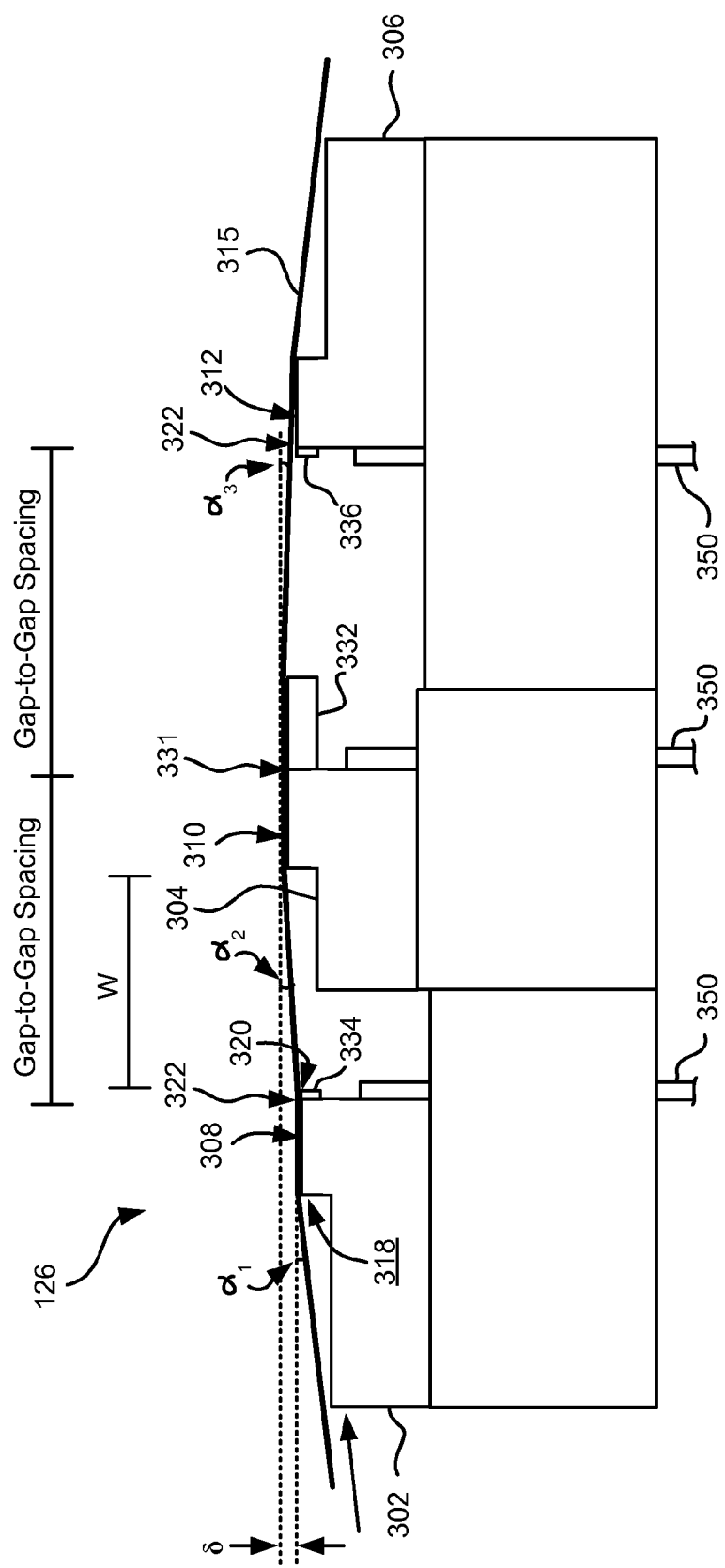
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
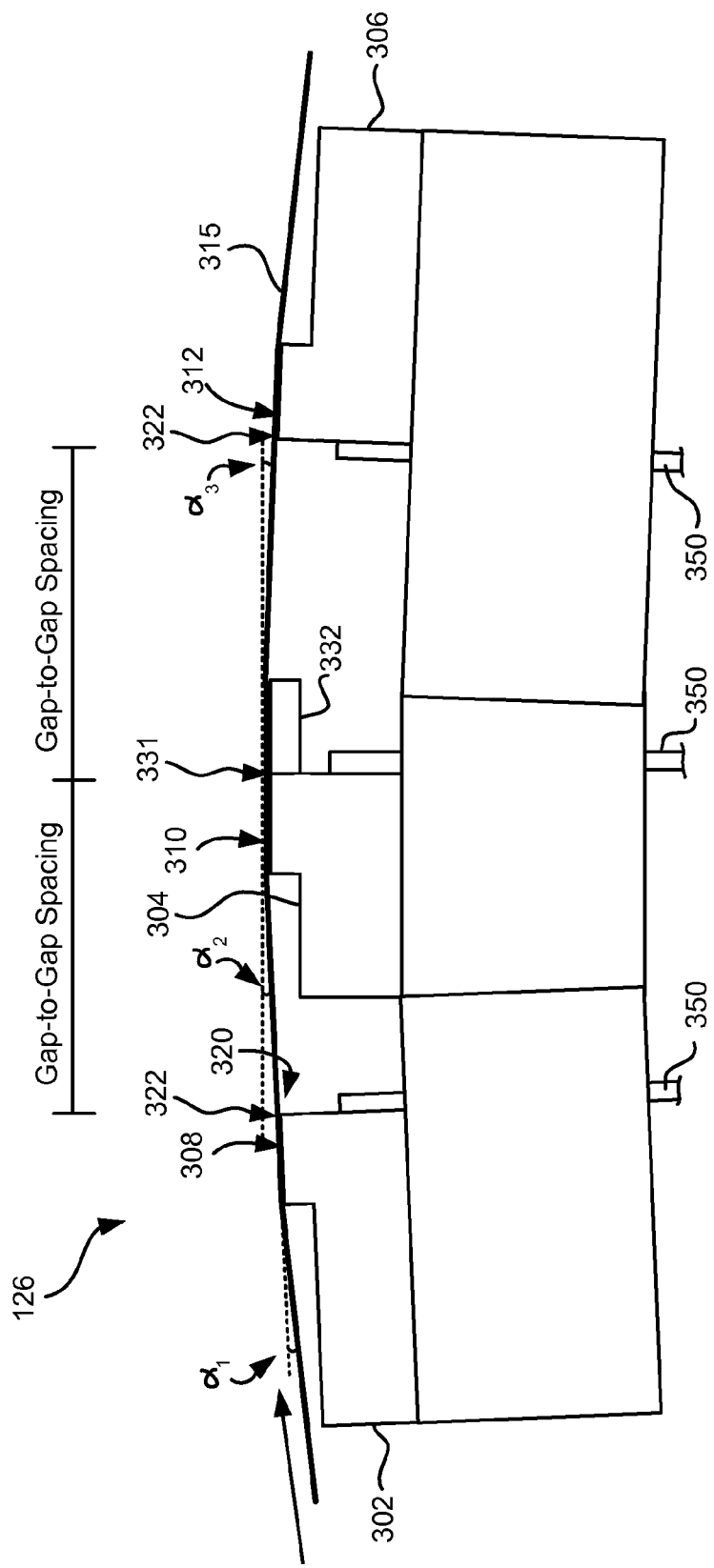
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
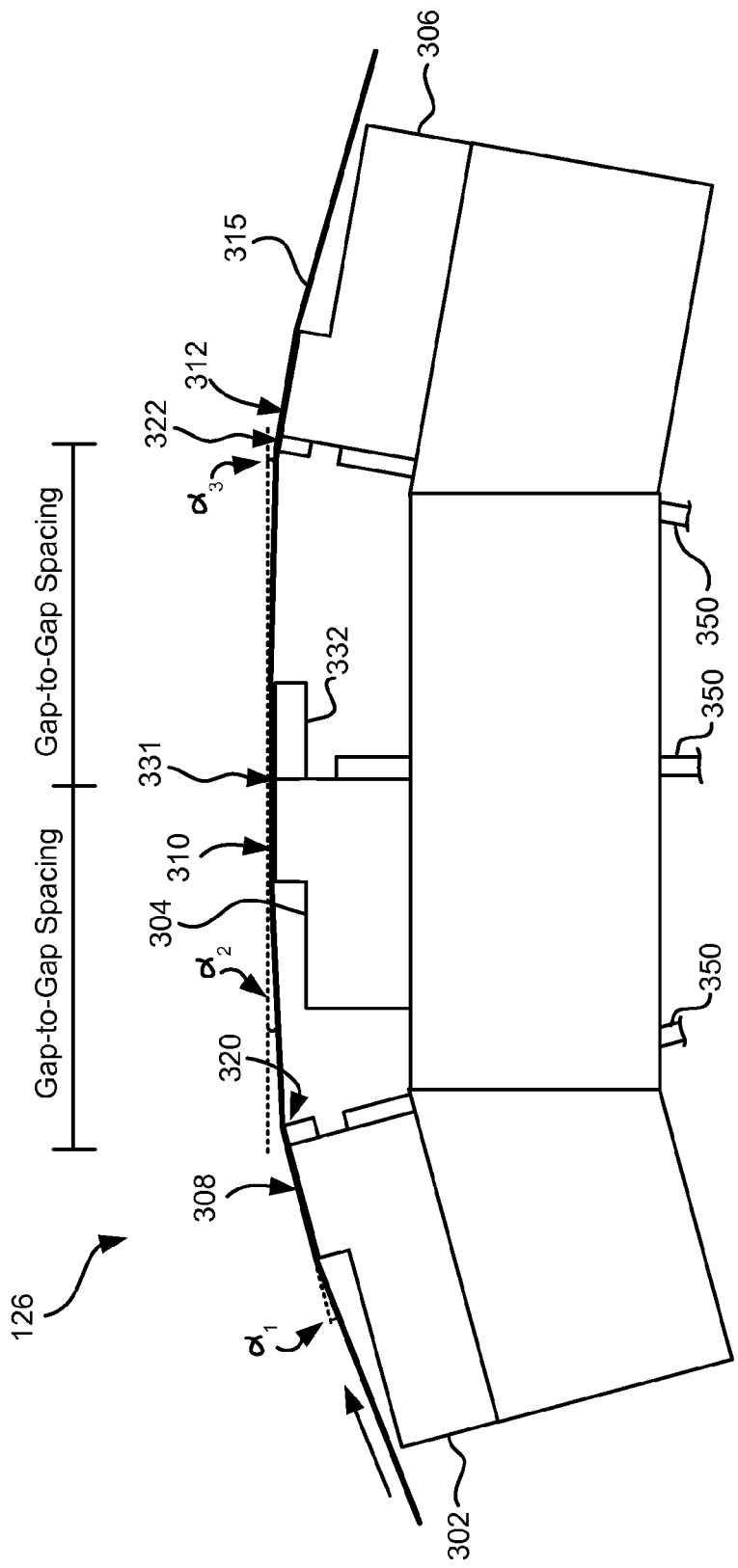
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As described above, an important and continuing goal in the data storage industry is that of increasing the density of data stored on a medium. For tape storage systems, that goal has led to increasing the track and linear bit density on recording tape, and decreasing the thickness of the magnetic tape medium. Similarly, improved data rates have been achieved by increasing the number of transducers positioned on a given head. However, developing smaller footprints, while also increasing the achievable data rate for higher performance tape drive systems, has created various problems in the design of a tape head assembly for use in such systems.

Several of the embodiments described herein implement components and/or processes which are desirably able to determine transistor setting information which yields a desired resistance for a variety of transistor devices and settings. Accordingly, some embodiments described herein implement the ability to perform self-tests to verify that the actual resistance of a transistor device about matches a desired resistance thereof, as will be described in further detail below.

While any type of gated devices, e.g., transistors, may be used in the transistor devices described herein, various types and/or configurations of specific devices are described in various embodiments to provide a context. This is done by way of example only, and is not intended to be limiting on the various embodiments of the present invention.

Figure 8:
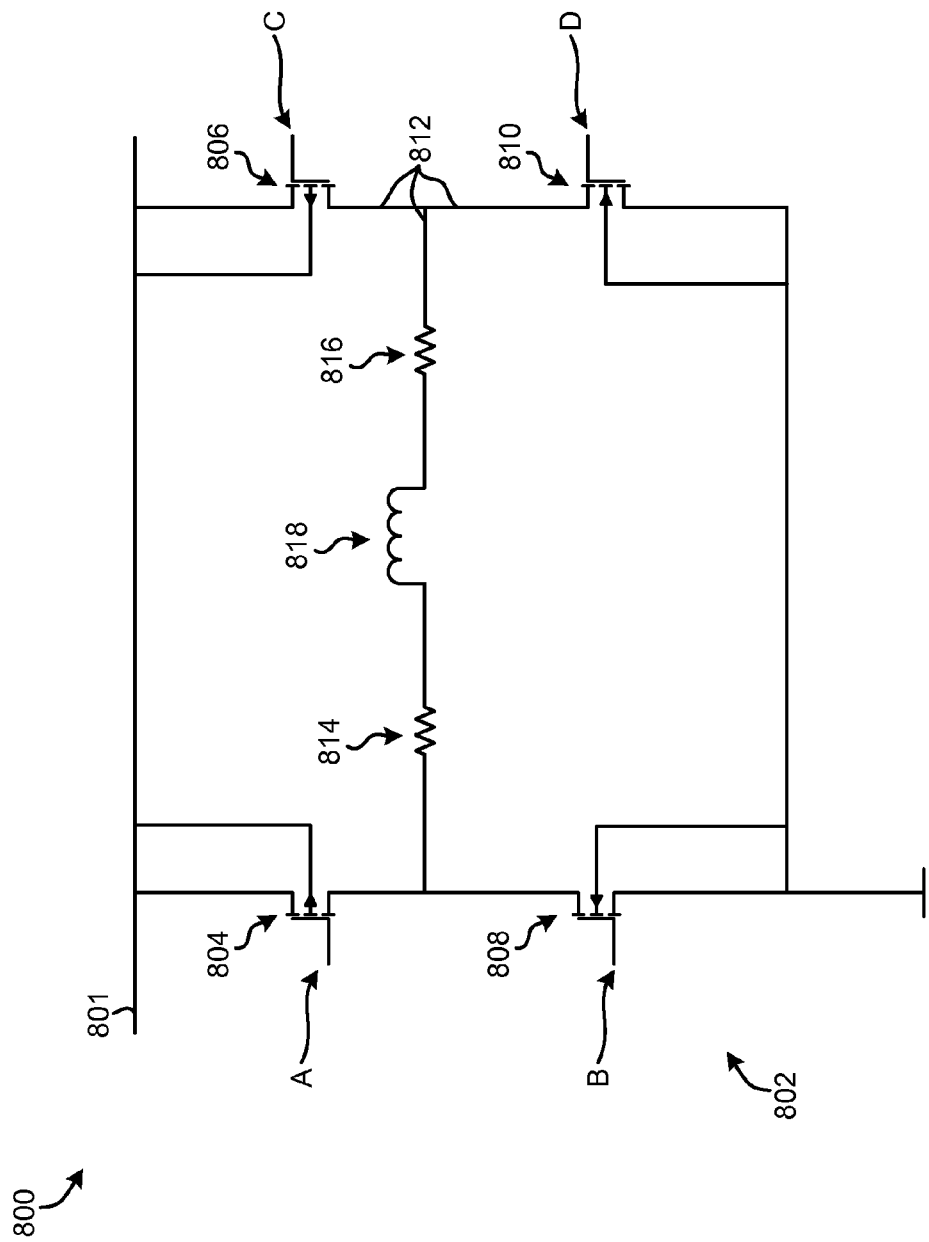
FIG. 8 is a representational diagram of an apparatus according to one embodiment.

FIG. 8 depicts an apparatus 800, in accordance with one embodiment. As an option, the present apparatus 800 may be implemented in conjunction with features from any other embodiment listed herein, such as those described with reference to the other FIGS. However, such apparatus 800 and others presented herein may be used in various applications and/or in permutations which may or may not be specifically described in the illustrative embodiments listed herein. Further, the apparatus 800 presented herein may be used in any desired environment. Thus FIG. 8 (and the other FIGS.) may be deemed to include any possible permutation.

Apparatus 800 includes a schematic representation of a write drive circuit 802 having an "H configuration", which may also be referred to herein as an "H driver". Write drive circuit 802 includes transistor devices 804, 806, 808, 810 electrically coupled to the circuitry 812 of the apparatus 800. Circuitry 812 may include wires, cables, conductive vias, electrical leads on a chip, etc., depending on the desired embodiment. Moreover, write resistors 814, 816 are connected in series with the externally connected write head 818 which may be used to perform write operations to a magnetic medium, e.g., magnetic tape (not shown). Moreover, it should be noted that the write head 818 may include any of the magnetic heads described herein, depending on the desired approach (e.g., see 126 of FIG. 1A).

Transistor devices 804, 806, 808, 810 may each include two or more transistors (also referred to herein as FET components) connected in parallel. According to the present embodiment, which is in no way intended to limit the invention, transistor devices 804 and 806 each include p-channel field-effect transistor (PFET) components coupled in parallel while transistor devices 808 and 810 include n-channel field-effect transistor (NFETs) components coupled in parallel. It follows that, by controlling the voltage applied to the gate of the transistor devices 804, 806, 808, 810, the write drive circuit 802 may be utilized to provide a bi-directional current flow through the externally connected write head 818 and the series resistors 814, 816. In other words, the write drive circuit 802 may be used to control the direction a write current is passed through the externally connected write head 818, thereby enabling apparatus 800 to write data to magnetic media.

For example, when transistor devices 804, 810 are both turned on (i.e., closed) and transistor devices 806, 808 are both turned off (i.e., opened), current resulting from an operating voltage (e.g., write voltage) applied to input 801 will flow through the write head 818 from left to right. Alternatively, when transistor devices 804, 810 are both turned off (i.e., opened) and transistor devices 806, 808 are both turned on (i.e., closed), current resulting from an operating voltage applied to input 801 will flow through the write head 818 from right to left. By turning on a transistor device, the device is placed in a conductive state, thereby allowing current to pass therethrough, while devices which are turned off are placed in a nonconductive state, thereby not allowing any current to pass therethrough. As would be appreciated by one skilled in the art upon reading the present description, changing the direction which current flows through the write head 818 may cause the direction of magnetic flux applied to a magnetic medium to be reversed. For instance, a current which runs from left to right may produce a flux from a write pole that orients the magnetization of magnetic grains on tape in a first direction, while a current which runs from right to left may cause the magnetization of magnetic grains on tape to become oriented in a second direction opposite the first direction, thereby creating detectable magnetic transitions.

The process of turning a transistor device on or off depends on the type of transistor device. For instance, when the gate of a PFET is connected to ground, the PFET is turned on (or closed), and when the gate of a PFET is connected to an operating voltage approximately equal to the value of voltage applied at input 801, the PFET is turned off (or open). However, when the gate of an NFET is connected to ground, the NFET is turned off (or open), and when the gate of an NFET is connected to an operating voltage approximately equal to the value of the voltage applied at input 801, the NFET is turned on (or closed). Thus, referring still to the embodiment illustrated in FIG. 8, to turn the PFET components of transistor devices 804, 806 on, gates A and C are supplied a ground potential, e.g., connected to ground. Alternatively, to turn the PFET components of transistor devices 804, 806 off, gates A and C are supplied a potential equal to an operating voltage value approximately equal to the value of the voltage applied at input 801 of the apparatus 800. Similarly, to turn NFET components of transistor devices 808, 810 on, gates B and D are supplied an operating voltage potential approximately equal to the value applied at input 801, while turning NFET components of transistor devices 808, 810 off includes connecting gates B and D to ground potential. In practice, inverters may be used to control the conductivity of multiple transistors by controlling the potential supplied to the gates thereof. Furthermore, it should be noted that the foregoing placement (e.g., orientation) and/or types of transistor devices are presented by way of example and are in no way intended to limit the invention. Rather, any type of transistor may be implemented depending on the desired embodiment.

The characteristics of the transistor devices 804, 806, 808, 810 are preferably chosen such that the write drive circuit 802 performs efficiently, e.g., depending on the desired write voltage. Write voltages implemented in the embodiments described herein are preferably between about 1.5 volts and about 3 volts, more preferably between about 1.5 volts and about 3.6 volts, but could be higher or lower depending on the desired approach. According to some approaches, an operating voltage may be determined based, at least in part, on a corresponding amount of power consumption, available resources, characteristics of a magnetic medium being written to and/or read from, etc. However, variations in the properties of the transistor devices 804, 806, 808, 810 have more of an effect on the performance of the apparatus 800 as operation voltages (e.g., write voltages) continue to be reduced. For example, variations in the effective resistance of each of the transistor devices 804, 806, 808, 810 may have a significant effect on the signal produced by the write head 818. Such variations may result from manufacturing tolerances, design type, age (e.g., an amount of use) of the device, etc. Accordingly, various embodiments described and/or suggested herein are able to calibrate and implement an effective resistance of the transistors being used, as will soon become apparent.

In various embodiments, transistor devices 804, 806, 808, 810 may have any type of configuration that enables the resistance therethrough to be adjusted. For example, each transistor device may include any type of component known in the art that provides the requisite functionality. In a preferred approach, the transistor devices include arrays of transistor components arranged in parallel. In one exemplary approach, looking to FIGS. 9A-9B, transistor devices 900 and 950 are depicted in accordance with two respective embodiments. As an option, the present transistor devices 900 and 950 may be implemented in conjunction with features from any other embodiment listed herein, such as those described with reference to the other FIGS., e.g., can be used as transistor devices 804, 806, 808, 810 of FIG. 8. However, such transistor devices 900 and 950 and others presented herein may be used in various applications and/or in permutations which may or may not be specifically described in the illustrative embodiments listed herein. Further, the transistor devices 900 and 950 presented herein may be used in any desired environment. Thus FIGS. 9A-9B (and the other FIGS.) may be deemed to include any possible permutation.

Figure 9A:
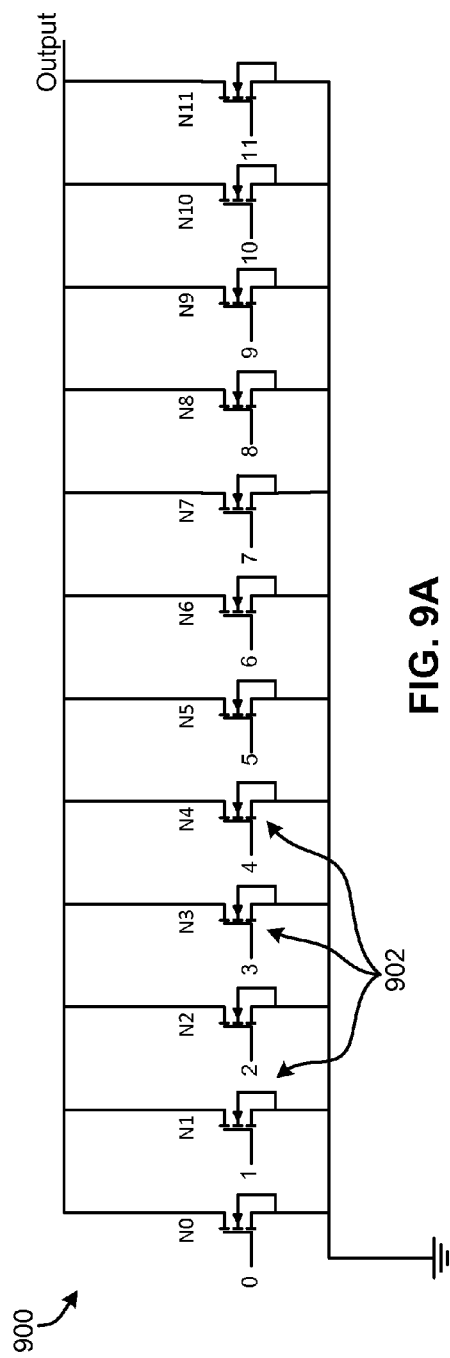
FIG. 9A is a representational diagram of a transistor device having multiple NFET components according to one embodiment.

Referring now to FIG. 9A, transistor device 900 includes twelve NFET components 902 connected in parallel and labeled N0-N11. By connecting multiple NFET components 902 in parallel, the effective resistance of the transistor device 900 as a whole may be adjusted by changing the states of different combinations of the twelve NFET components 902. In other words, by closing and/or opening certain combinations of the twelve NFET components 902, the effective resistance of the transistor device 900 as a whole may be adjusted. For example, the resistance of the transistor device 900 may be increased by opening (turning off) a greater number of the NFET components 902, thereby reducing the effective width (e.g., size) of the transistor device 900. Similarly, the resistance of the transistor device 900 may be reduced by closing (turning on) a greater number of the NFET components 902, thereby increasing the effective width of the transistor device 900 seen at the output Output. As described above, a NFET component 902 may be opened (turned off) by connecting the gate of the component to ground, while connecting the gate of a NFET component 902 to a voltage approximately equal to the voltage applied to input 801 in FIG. 8 closes it (turns it on). Thus, it is preferred that the gate of each NFET component 902 may be selectively connected to a voltage supply or ground as desired, e.g., as controlled by a controller. The gates of the twelve NFET components 902 are labeled 0-11. Moreover, the substrate of each NFET component 902 is preferably connected to ground in the present embodiment.

Figure 9B:
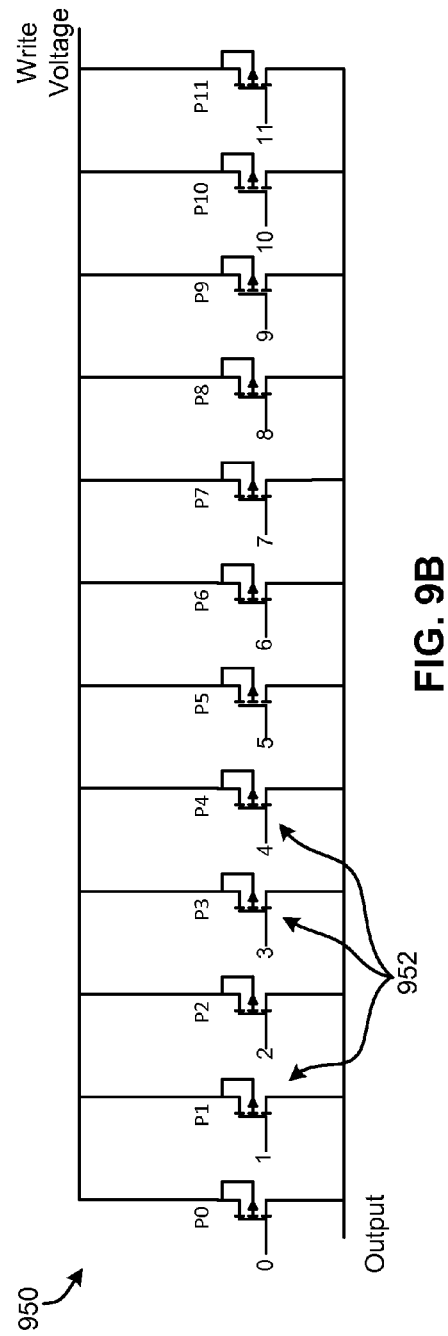
FIG. 9B is a representational diagram of a transistor device having multiple PFET components according to one embodiment.

Looking to FIG. 9B, the transistor device 950 includes twelve PFET components 952 connected in parallel and labeled P0-P11. As described above, connecting multiple PFET components 952 in parallel allows for the effective resistance of the transistor device 950 as a whole to be adjusted as desired by changing the states of (e.g., opening and/or closing) different combinations of the twelve PFET components 952. For example, the resistance of the transistor device 950 may be increased by opening (turning off) a greater number of the PFET components 952, thereby reducing the effective width of the transistor device 950 seen at the output Output. Similarly, the resistance of the transistor device 950 may be reduced by closing (turning on) a greater number of the PFET components 952, thereby increasing the effective width of the transistor device 950. An PFET component 952 may be opened (turned off) by applying an operating voltage Write Voltage to the gate of the device, while connecting the gate of a PFET device 952 to ground closes it (turns it on). Thus, it is preferred that the gate of each PFET component 952 may be selectively connected to a voltage supply equal to the "Write Voltage" or ground as desired, e.g., as controlled by a controller. The gates of the twelve PFET components 952 are labeled 0-11. Moreover, the well of each PFET component 952 is connected to the write voltage in the present embodiment.

Although the embodiments illustrated in FIGS. 9A-9B illustrate transistor devices having twelve NFET components and twelve PFET components respectively, a transistor device may include any desired number of FET components. According to various approaches, a transistor device may include two or more, three or more, four or more, five or more, at least ten, at least twelve, at least fifteen, multiple, etc. FET components which are preferably connected in parallel.

Figure 10A:
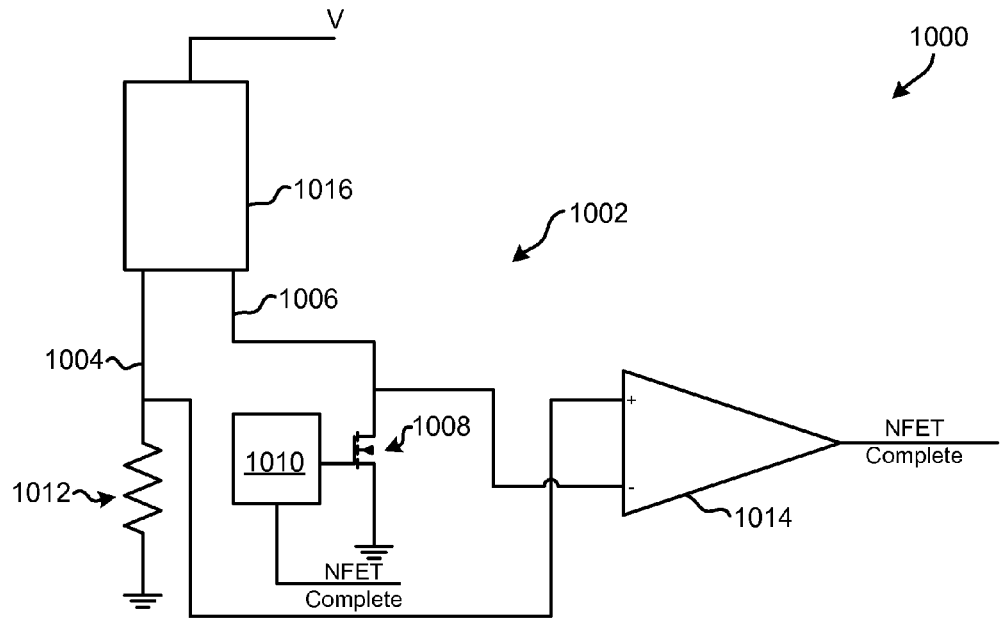
FIG. 10A is a representational diagram of an apparatus according to one embodiment.
Figure 10B:
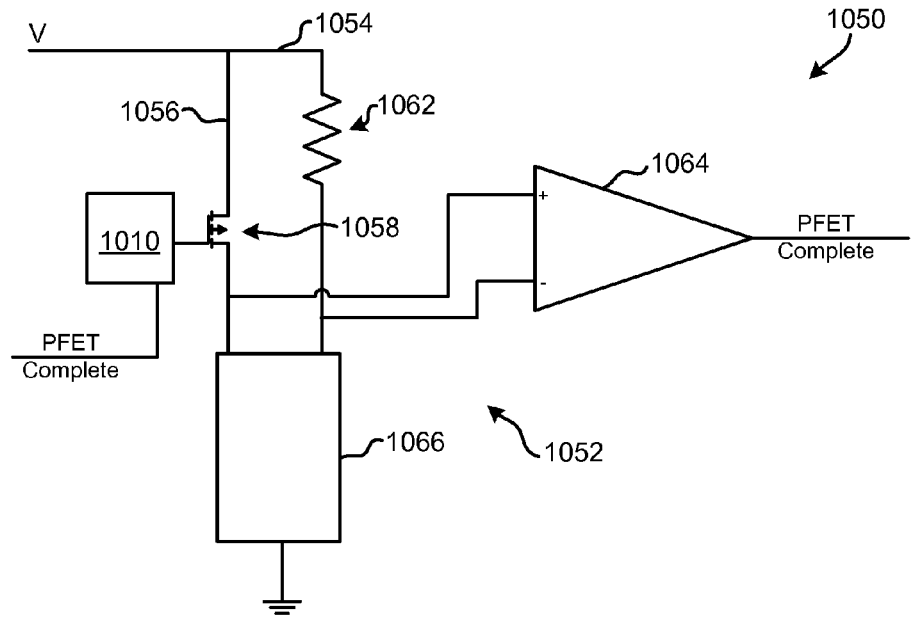
FIG. 10B is a representational diagram of an apparatus according to one embodiment.

The adjustable resistance of the transistor devices may be used to ensure the actual resistance of each transistor device matches a desired resistance thereof, thereby enabling the ability to compensate for processing variations as well as discrepancies between transistor devices. According to one embodiment, FIGS. 10A-10B depict apparatuses 1000, 1050 for comparing the actual resistance of a given transistor device with the desired resistance thereof. Depending on the result of a comparison conducted between the actual resistance of a transistor device and its desired resistance, the actual resistance of the transistor device itself may be adjusted to correct any discrepancies between the two, as will be described in further detail below.

As an option, the present apparatuses 1000, 1050 may be implemented in conjunction with features from any other embodiment listed herein, such as those described with reference to the other FIGS., such as FIGS. 8-9B and FIG. 11 below. However, such apparatuses 1000, 1050 and others presented herein may be used in various applications and/or in permutations which may or may not be specifically described in the illustrative embodiments listed herein. Further, the apparatuses 1000, 1050 presented herein may be used in any desired environment. Thus FIGS. 10A-10B (and the other FIGS.) may be deemed to include any possible permutation.

Looking specifically to FIG. 10A, apparatus 1000 includes a controller 1002 which has first and second circuits 1004, 1006 respectively. The second circuit 1006 includes a transistor device 1008 which is coupled to control logic 1010, which has an input signal NFET Complete supplied thereto. Moreover, the first circuit 1004 includes a resistor 1012 having a reference resistance which is preferably equal to an intended resistance value of the transistor devices (e.g., 808, 810 of FIG. 8) of the write driver (e.g., 802 of FIG. 8) under test. By matching the resistance of transistor device 1008 to the resistor 1012, the settings of the transistor device 1008 may be used to set the transistor devices (e.g., 808,810 of FIG. 8) of the write driver (e.g., 802 of FIG. 8) under test.

Apparatus 1000 further includes a current source 1016 coupled to input voltage V which preferably supplies an equal current to each of the first and second circuits 1004, 1006, e.g., using a current mirror. By supplying an equal current to both circuits 1004, 1006, current source 1016 may be used to generate voltages in each of the circuits that may be compared to determine desirable settings of the adjustable resistance for the second circuit as will be described in further detail below. The current source 1016 may be programmed to supply a current to one or both of the circuits having any value between 0 milliamps and about 22 milliamps, but could be higher or lower depending on the desired embodiment. According to an illustrative approach, the range of currents the current source 1016 is able to provide may be achieved by using a 7 bit current digital to analog converter (DAC).

First and second circuits 1004, 1006 are also connected to a comparator 1014 which is preferably able to compare direct current (DC) voltage values taken from the first and second circuits 1004, 1006, and output a comparison result NFET Complete which indicates whether the output voltage of the first circuit or the second circuit is higher. By comparing the voltage of the first and second circuits, the corresponding resistance of each circuit may be determined and preferably adjusted as desired, e.g., see method 1100 below.

According to the present embodiment, which is in no way intended to limit the invention, the transistor device 1008 includes multiple transistors (also referred to in this example as FET components) connected in parallel. Similar to transistor devices 808, 810 in FIG. 8, transistor device 1008 includes an array of multiple (e.g., two or more) NFET components connected in parallel, each of which may be individually opened or closed as desired by adjusting a voltage applied to the gates thereof. Thus, the transistor device 1008 of the second circuit 1006 includes two or more NFET components connected in parallel and has an adjustable resistance. The control logic 1010 may adjust the resistance of the second circuit 1006 by generating signals that turn on (close) one section of the transistor device 1008 at a time. Each time a component of the transistor device 1008 is turned on, the components that have already been turned on remain on (are not reset to an open/off state).

Referring now to FIG. 10B, apparatus 1050 includes a similar configuration having a controller 1052 which has first and second circuits 1054, 1056 respectively. The second circuit 1056 includes a transistor device 1058 which is coupled to control logic 1010. Moreover, the first circuit 1054 includes a resistor 1062 having a reference resistance which is preferably equal to an intended resistance value of the transistor device 1058.

Apparatus 1050 further includes a current sink 1066 which preferably ensures an equal current is passed through each of the first and second circuits 1054, 1056, e.g., using a current mirror. Current sink 1066 is preferably able to provide the same or similar currents to the first and second circuits 1054, 1056 of apparatus 1050 as current source 1016 is able to provide both circuits 1004, 1006 of apparatus 1000. By supplying an equal current to both circuits 1054, 1056, current sink 1066 may be used to generate voltages in each of the circuits that may be compared to determine desirable settings of the adjustable resistance for the second circuit as will be described in further detail below. The current sink 1066 may be programmed to supply a current to one or both of the circuits having any value between 0 milliamps and about 22 milliamps, but could be higher or lower depending on the desired embodiment. According to an illustrative approach, the range of currents the current sink 1066 is able to provide may be achieved by using a 7 bit current DAC.

First and second circuits 1054, 1056 are also connected to a comparator 1064 which is preferably able to compare DC voltage values taken from the first and second circuits 1054, 1056, and output a comparison result PFET Complete. As previously mentioned, by comparing the voltage of the first and second circuits, the corresponding resistance of each circuit may be determined and preferably adjusted when desired. According to the present embodiment, which is in no way intended to limit the invention, the transistor device 1058 includes multiple transistors connected in parallel. Similar to transistor devices 808, 810 in FIG. 8, transistor device 1058 includes an array of multiple (e.g., two or more) PFET components connected in parallel, each of which may be individually opened or closed as desired by adjusting a voltage applied to the gates thereof. Thus, the transistor device 1058 of the second circuit 1056 includes two or more PFET components connected in parallel and has an adjustable resistance. Moreover, according to some embodiments, the write drive circuit 802 of FIG. 8 may be implemented on the same chip as controller 1002 and/or controller 1052, but is in no way limited thereto.

It follows that a programmable current source and/or current sink may be used to generate a reference voltage by passing a desired amount of current through an external reference resistor. The same current may also be passed through the transistor device of a reference H-driver. By controlling the number of FET components that are on in a given transistor device (e.g., NFETs 1008 and/or PFETs 1058), the DC resistance of the transistor device may be set to be the same value as the respective external reference resistor. These settings may in turn be stored, and applied to the transistor devices of the write driver of a storage device controller. For example, the settings acquired using circuit 1000 of FIG. 10A may be used to set the number of NFET components in transistor devices 808 and 810 of FIG. 8; while the settings acquired using circuit 1050 of FIG. 10B may be used to set the number of PFET components in transistor devices 804 and 806 of FIG. 8.

With reference to the controllers 1002, 1052 of FIGS. 10A-10B, logic may be integrated with and/or executable by the controllers 1002, 1052 to cause either of the controllers to perform any one or more of the operations described below with reference to method 1100 of FIG. 11. As will soon become apparent, method 1100 may be implemented to ensure the actual resistance of a given transistor device closely matches a desired resistance value thereof. Moreover, it should be noted that the flowchart of method 1100 is shown according to an illustrative embodiment. The method 1100 may be performed in accordance with the present invention in any of the environments depicted in FIGS. 1-10B, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art. According to some exemplary embodiments, a computer program product may have a computer readable storage medium with program instructions embodied therewith which are readable and/or executable by a controller to cause the controller to perform any one or more of the processes associated with method 1100.

Figure 11:
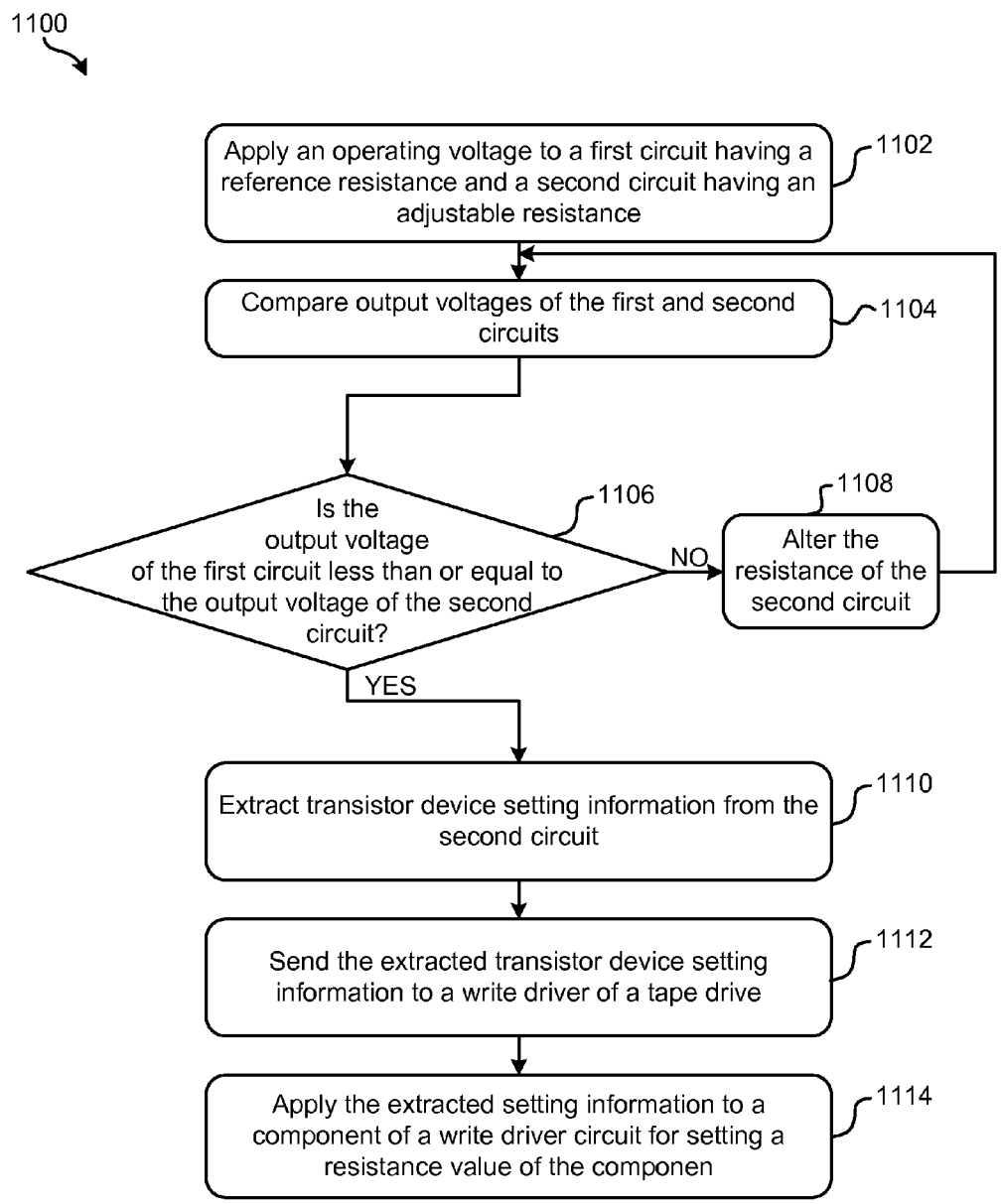
FIG. 11 is a flowchart of a method according to one embodiment.

As shown in FIG. 11, method 1100 includes operation 1102, where an operating voltage is applied to a first circuit having a reference resistance (e.g., see first circuits 1004, 1054 of FIGS. 10A-10B) and a second circuit having an adjustable resistance (e.g., see second circuits 1006, 1056 of FIGS. 10A-10B). Write voltages implemented in the embodiments described herein are preferably between about 1.5 volts and about 3 volts, more preferably between about 1.5 volts and about 3.6 volts, but could be higher or lower depending on the desired approach. As mentioned above, according to some approaches, an operating voltage may be determined based, at least in part, on a corresponding amount of power consumption, available resources, characteristics of a magnetic medium being written to and/or read from, etc. Moreover, by implementing a current source and/or current sink with the first and second circuits, equal currents may desirably be passed through the first and second circuits, e.g., as seen in FIGS. 10A-10B. Thus, as described above, and as would be appreciated my one of ordinary skill in the art, a programmable current source and/or current sink may be used to generate a reference voltage by passing a desired amount of current through a circuit.

Referring still to method 1100, operation 1104 includes comparing output voltages of the first and second circuits, e.g., using a comparator. In preferred approaches, the output voltage of the first and second circuits are both DC voltages, but are in no way limited thereto.

The output voltage of the first circuit serves as a reference point as it is affected by the desired amount of voltage drop across the reference resistance of the first circuit. Similarly, the output voltage of the second circuit corresponds to the adjusted resistance value of the second circuit. Thus, the output voltage of the first circuit may be used to tune the adjustable resistance of the second circuit by comparing it to the output voltage of the second circuit. By matching the output voltage of the first circuit with the output voltage of the second circuit, it may be ensured that the adjustable resistance of the second circuit is set to a desired value (the reference resistance value).

In the present embodiment, which is in no way intended to limit the invention, the adjustable resistance of the second circuit is reset to a maximum value each time method 1100 is initiated (e.g., operation 1102 is performed), thereby causing the output voltage of the second circuit to be a minimum value. By doing so, method 1100 is able to work towards a desired resistance value of the second circuit from a known minimum starting point. Accordingly, decision 1106 determines whether the output voltage of the first circuit is less than or equal to the output voltage of the second circuit. It should be noted that, according to some embodiments, decision 1106 may be equivalently performed by determining whether the output voltage of the second circuit is greater than or equal to the output voltage of the first circuit.

In response to determining that the output voltage of the first circuit is greater than the output voltage of the second circuit, method 1100 proceeds to operation 1108 which includes altering the resistance of the second circuit. As mentioned above, the second circuit has an adjustable resistance which is preferably embodied by a transistor device having an array of FET components. Accordingly, operation 1108 may be performed by sequentially changing states of different combinations of the FET components in the array. For example, the second circuit may include a transistor device having a plurality of FET components coupled in parallel, e.g., as illustrated in FIGS. 9A-9B, and each time decision 1106 results in a "NO", an additional one or more of the FET components in the array may be closed (turned on), thereby reducing the resistance of the second circuit from its previously higher value, and increasing the output voltage of the second circuit. However, it should be noted that if a large number (e.g., about all) of the FET components of a given transistor device are turned on, the power dissipation may be increased and the overall write performance may not be significantly improved.

Depending on the type of FET device included in the second circuit, closing one or more of the FET components thereof may be performed differently. For example, if the second circuit includes a FET device having a plurality of PFET components coupled in parallel, closing one or more of the PFET components may include selecting one or more PFET components having gates connected to an operating voltage and setting those gates equal to a ground potential. In another example, if the second circuit includes a FET device having a plurality of NFET components coupled in parallel, closing one or more of the NFET components may include selecting one or more NFET components having gates at a ground potential and setting those gates equal to an operating voltage (e.g., write voltage).

Once operation 1108 is performed, method 1100 returns to operation 1104 whereby the output voltages of the first and second circuits are compared again. According to an illustrative approach, which is in no way intended to limit the invention, the iterative process of performing operation 1104, decision 1106 and operation 1108, thereby returning to operation 1104 may be performed in about 2 to about 3 milliseconds, but could be shorter or longer.

Moreover, returning to decision 1106, method 1100 proceeds to operation 1110 in response to determining that the output voltage of the first circuit is less than or equal to the output voltage of the second circuit. According to some the approach, the resistance of the second circuit may be altered at least once. However, in some approaches the resistance of the second circuit may be sufficiently equal to the intended resistance of the transistor device, thereby obviating the need to adjust the resistance of the second circuit.

When the output voltage of the second circuit becomes greater than or equal to the output voltage of the first circuit, it may be determined that the adjustable resistance of the second circuit is sufficiently close to the reference resistance of the first circuit. In other words, when method 1100 determines that the output voltage of the second circuit becomes greater than or equal to the output voltage of the first circuit, the settings of the second circuit producing the given resistance value are ideal for the given circumstances (e.g., operating voltage, current, reference resistance, IC process variations, etc.). Accordingly, operation 1110 includes extracting transistor device setting information from the second circuit, while operation 1112 includes sending the extracted transistor device setting information to a write driver of a tape drive. Furthermore, operation 1114 includes applying the extracted setting information to a component (e.g., transistor device) of a write driver circuit for setting a resistance value of the component. It is preferred that the extracted setting information is applied to a component which is similar to that which the setting information was extracted from. For example, if the setting information was extracted form a second circuit having a transistor device with NFET components (e.g., as shown in FIG. 10A), it is preferred that the setting information is implemented in another transistor device having the same or a similar configuration of NFET components, e.g., rather than a transistor device having PFET components, or a transistor device having a different configuration of NFET components (e.g., a different number of NFETs coupled in parallel).

It should be noted that although the processes of method 1100 of FIG. 11 are described herein as being performed on a first and second circuit, any one or more of the processes may alternatively or additionally be performed on third and fourth circuits having similar or the same properties of the first and second circuits described above. For example, method 1100 of FIG. 11 may be performed on an apparatus having first and second circuits which include a transistor device having NFET components (e.g., see FIG. 10A), in addition to being performed on an apparatus having first and second circuits which include a transistor device having PFET components (e.g., see FIG. 10B).

The ability to determine and implement desirable transistor device settings (e.g., set the number of NFET and/or PFET components in a given transistor device) as introduced in various ones of the embodiments herein, results in improved performance. As mentioned above, the resistance properties of a given FET device will not track from NFET components to PFET components. For example, because of process variations, it is possible to have a very low "on resistance" for a PFET component and a very high "on resistance" for an NFET component having the same settings and at the same time on a given chip. Similarly, processing variations may result in performance differences between transistor devices of the same type, e.g., between NFETs manufactured at different times, locations, etc. Thus, various embodiments disclosed herein are able to tune the effective resistance of H-Driver devices such that the impedance of the H-Driver may be desirable matched to an external load. By controlling the number of FET components that are on in a given transistor device (e.g., NFETs and/or PFETs), the DC resistance of the transistor device may be set to be the same values as an external reference resistor which may be selected to represent an intended resistance of the transistor device.

The processes of method 1100 may be performed to determine efficient transistor device setting information as desired. According to different approaches, one or more of the operations in FIG. 11 may be performed every time the operation voltage is changed, every time a different tape is loaded into a corresponding tape drive, every time a tape velocity is changed, after a predetermined amount of time, upon request, etc. Thus, any one or more of the operations in FIG. 11 may be performed regardless of whether a tape is present in the drive (e.g., adjacent the write head) or not. In other approaches, desired transistor device setting information may be predetermined for a wide range of operation voltages, tape type (e.g., generation), tape velocities, etc. and stored in memory, such as a lookup table, to be accessed and implemented upon detecting one of the previously tested settings. As a result, processing requirements, time to implement, etc. may be reduced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a controller, comprising:
        a first circuit having a reference resistance;
        a second circuit having an adjustable resistance; and
        logic integrated with and/or executable by the controller, the logic being configured to cause the controller to perform the following process:
            apply a voltage to the first and second circuits;
            compare output voltages of the first and second circuits;
            alter the resistance of the second circuit until the output voltage of the first circuit is less than or equal to the output voltage of the second circuit;
            extract setting information in response to determining that the first voltage of the first circuit is less than or equal to the second voltage of the second circuit; and
            apply the extracted setting information to a component of a write driver circuit for setting a resistance value of the component.

2. An apparatus as recited in claim 1, wherein the second circuit includes two or more transistors connected in parallel.

3. An apparatus as recited in claim 2, wherein altering the resistance of the second circuit includes sequentially changing states of different combinations of the transistors.

4. An apparatus as recited in claim 2, wherein the two or more transistors are NFET components.

5. An apparatus as recited in claim 2, wherein the two or more transistors are PFET components.

6. An apparatus as recited in claim 1, wherein the voltage applied to the first and second circuits is between 1.5 and 3 volts.

7. An apparatus as recited in claim 1, comprising:
    a drive mechanism for passing a magnetic medium over a magnetic head coupled to the write driver circuit; and
    a controller electrically coupled to the magnetic head.

8. An apparatus as recited in claim 1, comprising:
    a third circuit having a second reference resistance; and
    a fourth circuit having an adjustable resistance;
    wherein the logic is configured to cause the controller to:
        apply a voltage to the third and fourth circuits;
        compare output voltages of the third and fourth circuits;
        alter the resistance of the fourth circuit until the output voltage of the third circuit is less than or equal to the output voltage of the fourth circuit;
        extract setting information in response to determining that the third voltage of the third circuit is less than or equal to the fourth voltage of the fourth circuit; and
        applying the extracted setting information to a component of a write driver circuit for setting a resistance value of the component,
    wherein the second circuit includes two or more PFET components connected in parallel,
    wherein the fourth circuit includes two or more NFET components connected in parallel.

9. A computer program product comprising a computer readable storage medium having program instructions embodied therewith, the program instructions readable and/or executable by a controller to cause the controller to:
    apply, by the controller, a voltage to a first circuit having a reference resistance and a second circuit having an adjustable resistance;
    compare, by the controller, output voltages of the first and second circuits;
    alter, by the controller, the resistance of the second circuit until the output voltage of the first circuit is less than or equal to the output voltage of the second circuit;
    extract, by the controller, setting information in response to determining that the first voltage of the first circuit is less than or equal to the second voltage of the second circuit; and
    apply, by the controller, the extracted setting information to a component of a write driver circuit for setting a resistance value of the component.

10. A computer program product as recited in claim 9, wherein the second circuit includes two or more transistors connected in parallel.

11. A computer program product as recited in claim 10, wherein altering the resistance of the second circuit includes sequentially changing states of different combinations of the transistors.

12. A computer program product as recited in claim 10, wherein the two or more transistors are NFET components.

13. A computer program product as recited in claim 10, wherein the two or more transistors are PFET components.

14. A computer program product as recited in claim 9, wherein the voltage applied to the first and second circuits is between 1.5 and 3 volts.

15. A computer program product as recited in claim 9, the program instructions readable and/or executable by the controller to cause the controller to:
    apply, by the controller, a voltage to a third circuit having a second reference resistance and a fourth circuit having an adjustable resistance;
    compare, by the controller, output voltages of the third and fourth circuits;
    alter, by the controller, the resistance of the fourth circuit until the output voltage of the third circuit is less than or equal to the output voltage of the fourth circuit; and
    extract, by the controller, setting information in response to determining that the third voltage of the third circuit is less than or equal to the fourth voltage of the fourth circuit; and apply, by the controller, the extracted setting information to a component of a write driver circuit for setting a resistance value of the component, wherein the second circuit includes two or more PFET components connected in parallel, wherein the fourth circuit includes two or more NFET components connected in parallel.

16. A method, comprising:

passing a current through first and second circuits, the first circuit having a reference resistance, the second circuit having an adjustable resistance;

comparing output voltages of the first and second circuits;

altering the resistance of the second circuit at least once in response to determining that the first voltage of the first circuit is greater than the second voltage of the second circuit;

extracting setting information in response to determining that the first voltage of the first circuit is less than or equal to the second voltage of the second circuit; and applying the extracted setting information to a component of a write driver circuit for setting a resistance value of the component.

17. A method as recited in claim 16, wherein the second circuit includes two or more transistors connected in parallel.

18. A method as recited in claim 17, wherein the two or more transistors are NFET components or PFET components.

19. A method as recited in claim 17, wherein altering the resistance of the second circuit includes sequentially changing states of different combinations of the transistors.

20. A method as recited in claim 16, wherein the voltage applied to the first and second circuits is between 1.5 and 3 volts.

* * * * *